(12) United States Patent
Kostanski et al.

(10) Patent No.: US 11,725,744 B2
(45) Date of Patent: Aug. 15, 2023

(54) SELF CLOSING TAPS

(71) Applicant: B/E Aerospace, Inc., Winston Salem, NC (US)

(72) Inventors: Piotr Kostanski, Wroclaw (PL); Modest Adam Reszewicz, Wroclaw (PL); Pawel Swirniak, Wroclaw (PL)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/666,842

(22) Filed: Feb. 8, 2022

(65) Prior Publication Data
US 2022/0252174 A1     Aug. 11, 2022

(30) Foreign Application Priority Data
Feb. 10, 2021   (EP) .................................. 21461510

(51) Int. Cl.
*F16K 21/06*     (2006.01)
*B05B 1/30*     (2006.01)

(52) U.S. Cl.
CPC ............ *F16K 21/06* (2013.01); *B05B 1/3026* (2013.01); *Y10T 137/9464* (2015.04)

(58) Field of Classification Search
CPC .................. F16K 21/06; B05B 1/3026; Y10T 137/9464

(Continued)

(56) References Cited

U.S. PATENT DOCUMENTS

| 1,555,755 | A | * | 9/1925 | Pratt | .......................... E03D 3/04 |
| | | | | | 251/44 |
| 1,950,749 | A | * | 3/1934 | Ross | ....................... F16K 21/04 |
| | | | | | 251/275 |

(Continued)

FOREIGN PATENT DOCUMENTS

| CN | 2729466 Y | 9/2005 |
| EP | 1429061 A1 | 6/2004 |

OTHER PUBLICATIONS

Extended European Search Report issued in EP 21461510.6, dated Aug. 19, 2021.

*Primary Examiner* — Craig M Schneider
*Assistant Examiner* — Frederick D Soski
(74) *Attorney, Agent, or Firm* — Locke Lord LLP; Joshua L. Jones

(57) ABSTRACT

A self closing tap (102) comprising a cartridge (12) and a tap handle interface is disclosed. The cartridge (12) comprises a piston (122), and a plunger (32). The piston (122) is comprised of a piston head (124), and a piston shaft (126), the piston shaft (126) has a longitudinal axis (A) and is fixed to the piston head (124) at a first end, and the second end of the piston shaft (126) is an engagement end (182). The plunger (32) is movably fixed to a first portion of the piston shaft (126) and adapted to move longitudinally along the first portion of the piston shaft (126). The plunger (32) has a first and second end with the second end of the plunger (32) being closer to the engagement end (182) of the piston shaft than the first end, the tap handle interface comprises a first and second recess (186, 154), the first recess (186) is adapted to receive the engagement end (182) of the piston shaft (126) and prevent rotation of the piston shaft (126) around its longitudinal axis (A), and the second recess (154) is adapted to receive at least the second end (126) of the plunger (32) and to prevent rotation of the plunger (32) around the piston shaft (126).

15 Claims, 3 Drawing Sheets

(58) Field of Classification Search
USPC .......................................................... 251/54
See application file for complete search history.

(56) References Cited

U.S. PATENT DOCUMENTS

| | | | | |
|---|---|---|---|---|
| 2,324,946 | A * | 7/1943 | Molloy | F16K 21/10 251/50 |
| 4,093,177 | A * | 6/1978 | Morris | F16K 31/48 188/316 |
| 4,165,857 | A * | 8/1979 | Morris | F16K 31/48 188/316 |
| 4,268,008 | A | 5/1981 | Barnum et al. | |
| 4,653,534 | A * | 3/1987 | Chung-Shan | F16K 31/48 137/624.12 |
| 4,768,553 | A * | 9/1988 | Marx | F16K 21/06 251/20 |
| 4,819,909 | A * | 4/1989 | Hart | F16K 21/06 251/48 |
| 4,934,651 | A * | 6/1990 | Nowicki | F16K 21/04 251/30.04 |
| 4,936,347 | A * | 6/1990 | Oracz | F16K 11/078 251/54 |
| 5,295,654 | A * | 3/1994 | Laube | F16K 21/06 251/35 |
| 7,108,011 | B1 * | 9/2006 | Lordahi | F16K 21/06 251/324 |
| 7,694,935 | B2 * | 4/2010 | Wang | F16K 21/12 251/12 |
| 8,555,922 | B2 * | 10/2013 | Migliore | F16K 11/0856 137/625.41 |
| 8,707,983 | B1 * | 4/2014 | Chen | F16K 21/12 4/678 |
| 10,329,750 | B2 | 6/2019 | Yuan et al. | |
| 2003/0034473 | A1 * | 2/2003 | Lenart | F16K 31/602 251/231 |
| 2003/0189111 | A1 * | 10/2003 | Heren | F16K 31/3855 239/525 |
| 2004/0144944 | A1 * | 7/2004 | Roethel | F16K 21/06 251/240 |
| 2006/0145117 | A1 * | 7/2006 | Kao | F16K 27/02 251/339 |
| 2006/0202138 | A1 * | 9/2006 | Yeh | F16K 21/12 251/15 |
| 2008/0271287 | A1 * | 11/2008 | Gustafson | F16K 31/60 16/110.1 |
| 2009/0044865 | A1 * | 2/2009 | Migliore | F16K 11/0856 137/1 |
| 2009/0084999 | A1 * | 4/2009 | Wang | F16K 21/12 251/337 |
| 2017/0059050 | A1 * | 3/2017 | Chiu | F16K 11/076 |
| 2020/0003312 | A1 * | 1/2020 | Xia | F16K 31/3855 |

* cited by examiner

SELF CLOSING TAPS

CROSS REFERENCE TO RELATED APPLICATIONS

This Application claims priority to Application European Patent Application No. EP 21461510.6 filed on Feb. 10, 2021. The entire contents of this application are incorporated herein by reference in their entirety.

This disclosure relates to self closing taps, in particular it relates to the timing mechanism of self closing taps.

Self closing taps (often known as non-concussive taps) are known and are constructed and function in the fashion discussed in connection with FIG. 2.

The time the tap takes to close can be adjusted. The known timing mechanism to self closing taps includes a piston shaft and a plunger moveably fixed to the piston shaft.

A critical feature of the timing mechanism of known self closing taps is that the longitudinal position of the plunger on the piston shaft has a direct correlation with the length of time, within a range of a minimum time to a maximum time, that the tap takes to turn off after the tap has been fully opened. This is because the longitudinal position of the plunger on the piston shaft determines how much of a water filled chamber in the tap is purged/emptied of water by the piston head when the tap is caused to turn on. A minimum closure time is achieved when the minimum amount of water is purged from the cylinder and a maximum closure time is achieved when as much water as possible is purged from the chamber. A change of the longitudinal position of the plunger on the piston shaft thus results in a change in the period of time the tap runs before it turs off.

According to a first aspect of the present disclosure, there is provided a self closing tap comprising a cartridge and a tap handle interface, in which the cartridge comprises a piston, and a plunger. The piston is comprised of a piston head and a piston shaft, the piston shaft has a longitudinal axis and is fixed to the piston head at a first end, and the second end of the piston shaft is an engagement end. The plunger is movably fixed to a first portion of the piston shaft and adapted to move longitudinally along the first portion of the piston shaft. The plunger has a first and second end with the second end of the plunger being closer to the engagement end of the piston shaft than the first end. The tap handle interface comprises a first and second recess, the first recess is adapted to receive the engagement end of the piston shaft and prevent rotation of the piston shaft around its longitudinal axis, and the second recess is adapted to receive at least the second end of the plunger and to prevent rotation of the plunger around the piston shaft.

In an embodiment of the above embodiments, the tap handle interface is integral with a tap handle.

The relative positions of the plunger and the piston shaft of a self closing tap can be altered intentionally or unintentionally. A user may intentionally alter the longitudinal positon of the plunger on the piston shaft by rotating one of the plunger and the piston shaft relative to the other.

Unintentional alteration of the longitudinal positon of the plunger on the piston shaft may result from one or more of the following causes:
- vibration of the plunger and piston or the tap as a whole;
- repeated use of the tap where, for example, there are asymmetric forces applied to the plunger or piston when the tap is caused to turn on or off; and
- asymmetric heating/cooling of the plunger and or piston shaft.

Known self closing taps seek to minimise the likelihood of unintentional alteration of the longitudinal positon of the plunger on the piston shaft by the use of a set screw and adhesive as discussed below in connection with FIG. 2. This solution is, however susceptible to failure, in particular the tap or plunger and piston are subject to extended and/or violent vibration such as may be caused by flow in the conduits supplying water to the tap and/or the location in which the tap is deployed, for example on a vehicle, for example an aircraft.

The arrangement of the self closing tap of the present disclosure is particularly advantageous because the prevention of rotation of the plunger and the piston shaft, and as a result any possibility of relative rotation between the plunger and the piston shaft, when the tap handle interface is engaged with the engagement end and plunger, has the result that the longitudinal positon of the plunger on the piston shaft will not alter when the tap is in use or ready for use. This is achieved in a less complex fashion and using fewer parts than the set screw and adhesive approach of known self closing taps. The arrangement of the present invention is unlikely to fail mechanically in contrast to the set screw and adhesive solution where, for example, the adhesive may fail.

A further advantage of the present disclosure is that when a user is servicing or intentionally adjusting the tap of the present disclosure there is no risk of loss of the set screw or any requirement that the user has an appropriate adhesive with him.

In an embodiment of any of the above embodiments the plunger comprises a bore which extends through the plunger from the first end to the second end and the bore is threaded with a helical thread. The first portion of the piston shaft has a helical thread on the outside face of the piston shaft, and the fixing of the plunger to the piston shaft is via the engagement of the helical threads of the bore and the first portion of the piston shaft. In this embodiment rotation of the plunger around the piston shaft causes movement of the plunger along the piston shaft under the influence of the helical thread. Reference to rotation of the plunger about the piston shaft in this description is reference to an arrangement wherein the plunger at least partially surrounds the piston shaft and rotates about substantially the same axis as the longitudinal axis of the piston shaft.

In an embodiment of any of the above embodiments, the engagement end has a cross section substantially the shape of a polygon in a plane substantially perpendicular to the longitudinal axis of the piston shaft. In some embodiments the polygon is a triangle or a quadrilateral. In other embodiments the polygon has a greater number of faces than four.

In an embodiment of any of the above embodiments the engagement end extends for a distance from the end of the piston shaft remote from the piston head, for example a distance of between 2 and 10 mm, between 2 and 20 mm, or between 2 and 30 mm.

In an embodiment of any of the above embodiments the cross section of the engagement end is uniform along the length of the engagement end.

In an embodiment of any of the above embodiments the cross sectional dimensions of the engagement end are uniform along the length of the engagement end. In an alternative embodiment of any of the above embodiments the cross sectional dimensions of the engagement end vary along the length of the engagement end.

In an embodiment of any of the above embodiments, the first recess has a cross section substantially the shape of a polygon in a plane substantially perpendicular to the longitudinal axis of the piston shaft when the recesses in the tap handle interface are engaged with the engagement end and the second end of the plunger. In some embodiments the polygon is a triangle or a quadrilateral. In other embodiments the polygon has a greater number of faces than four. In some embodiments the polygon is a triangle or a quadrilateral. In other embodiments the polygon has a greater number of faces than four.

In an embodiment of any of the above embodiments the first recess extends into the tap handle interface for a distance of between 2 and 10 mm, between 2 and 20 mm, or between 2 and 30 mm.

In an embodiment of any of the above embodiments the cross section of the first recess is uniform along the length of the first recess.

In an embodiment of any of the above embodiments the cross sectional dimensions of the first recess are uniform along the length of the engagement end. In an alternative embodiment of any of the above embodiments the cross sectional dimensions of the first recess vary along the length of the first recess.

In an embodiment of any of the above embodiments, the cross section of the first recess is substantially the same shape as the cross section of the engagement end. For example the cross section of the first recess and the engagement end may both be squares or rectangles. In other examples the cross sections may both be hexagons. In such examples the greater the number of sides the cross section of the recess/engagement end have, the greater the number of orientations in which the engagement end may enter the first recess.

In an alternative embodiment of the above embodiments, the cross sectional shape of the engagement end is different to the cross sectional shape of the first recess.

In an embodiment of any of the above embodiments the engagement end comprises one or more ribs or grooves, the first recess comprises one or more of the other of ribs or grooves, and the ribs of the engagement end or first recess are configured to engage with the grooves of the first recess or engagement end when the engagement end is introduced into the first recess. In some examples the ribs and grooves extend in a direction substantially parallel with the central axis of the piston shaft. In some examples the engagement end is a splined shaft and the first recess includes female splines adapted to mesh with the splined shaft of the engagement end.

In an embodiment of any of the above embodiments the second end of the plunger has a cross section substantially the shape of a polygon in a plane substantially perpendicular to the longitudinal axis of the piston shaft. In some embodiments the polygon is a triangle or a quadrilateral. In other embodiments the polygon has a greater number of faces than four.

In an embodiment of any of the above embodiments the second end of the plunger extends for a distance from the face of the plunger remote from the piston head, for example between 0.1 and 10 mm, between 0.1 and 20 mm, or between 0.1 and 30 mm.

In an embodiment of any of the above embodiments the cross section of the second end of the plunger is uniform along the length of the second end.

In an embodiment of any of the above embodiments the cross sectional dimensions of the second end of the plunger are uniform along the length of the second end. In an alternative embodiment of any of the above embodiments the cross sectional dimensions of the second end of the plunger vary along the length of the second end.

In an embodiment of any of the above embodiments the second recess has a cross section substantially the shape of a polygon in a plane substantially perpendicular to the longitudinal axis of the piston shaft when the recesses in the tap handle interface are engaged with the engagement end and the second end of the plunger. In some embodiments the polygon is a triangle or a quadrilateral. In other embodiments the polygon has a greater number of faces than four. In some embodiments the polygon is a triangle or a quadrilateral. In other embodiments the polygon has a greater number of faces than four.

In an embodiment of any of the above embodiments the second recess extends into the tap handle interface for a distance of between 2 and 10 mm, between 2 and 20 mm, or between 2 and 30 mm.

In an embodiment of any of the above embodiments the cross section of the second recess is uniform along the length of the first recess.

In an embodiment of any of the above embodiments the cross sectional dimensions of the second recess are uniform along the length of the second recess. In an alternative embodiment of any of the above embodiments the cross sectional dimensions of the second recess vary along the length of the second recess.

In an embodiment of any of the above embodiments the cross section of the second recess is substantially the same shape as the cross section of the second end of the plunger. For example the cross section of the second recess and the second end of the plunger may both be squares or rectangles. In other examples the cross sections may both be hexagons. In such examples the greater the number of sides the cross section of the second recess/second end of the plunger have, the greater the number of orientations in which the second end of the plunger may enter the second recess.

In an alternative embodiment of the above embodiments, the cross sectional shape of the second end of the plunger is different to the cross sectional shape of the second recess.

In an embodiment of any of the above embodiments the second end of the plunger comprises one or more ribs or grooves, the second recess comprises one or more of the other of ribs or grooves, and the ribs of the second end or second recess are configured to engage with the grooves of the second recess or second end when the second end is introduced into the second recess. In some examples the ribs and grooves extend in a direction substantially parallel with the central axis of the piston shaft. In some examples the second end of the plunger is configured as a splined shaft and the second recess includes female splines adapted to mesh with the splined shaft of the second end of the plunger.

In an embodiment of any of the above embodiments the tap handle is a knob or a lever adapted to be pushed to cause the tap to open. If the tap handle is a lever, the lever has a pivot means at a first end, a free second end and the first and second recesses of an integral tap handle interface, or a mounting position for the tap handle interface are located in or on the body of the lever between the first and second ends.

In an embodiment of any of the above embodiments the tap further comprises a tap body. In an embodiment of any of the above embodiments the tap handle is fixed to the tap body using a tamper proof fixing means. This will minimise unwanted human adjustment of the time that the tap of the present disclosure takes to turn off.

In an embodiment of any of the above embodiments, the tap handle and tap body are so configured that the tap handle may rotate about the axis of the piston shaft. This rotation does not, however, cause any relative movement of the piston shaft and the plunger because rotation of the tap handle will cause equal rotation of both the piston shaft and the plunger. This is particularly beneficial where the tap is a mixer tap (it delivers a mixture of hot and cold water) and rotation of the handle controls the temperature of the water exiting the tap.

According to a second aspect of the present disclosure there is provided a kit of parts for repairing or updating a tap comprising one or more of a cartridge and a tap handle interface according to the first aspect of the present invention. This kit could be used to repair self closing taps according to the present disclosure, or to convert existing taps to become self closing taps according to the present disclosure.

According to a third aspect of the present disclosure there is provided a water supply system comprising at least one self closing tap according to the first aspect of the present invention, a water source, and one or more conduits fluidly connecting the or each tap with the water source. In some embodiments, the water supply system is located in a vehicle for land, sea or air.

According to a forth aspect of the present disclosure there is provided an aircraft comprising a water supply system according to the third aspect of the present invention.

The present disclosure will be further described and explained by way of example and with reference to the accompanying drawings in which FIG. 1 shows a self closing tap;

Figure 1:
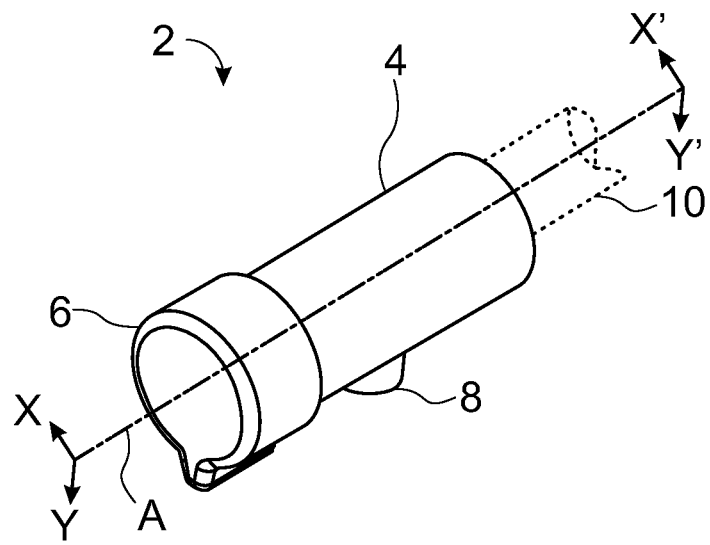

With reference to FIG. 1, a self closing tap 2 includes a tap body 4, a tap handle in the form of a knob 6, and a spout 8. The spout 8 is in fluid communication with a water supply 10 via the tap body 4. To operate the tap 2 a user pushes the knob 6 toward the tap body 4 which causes a flow of water through the tap 2 from the supply 10 and out of the spout 8.

Figure 2:
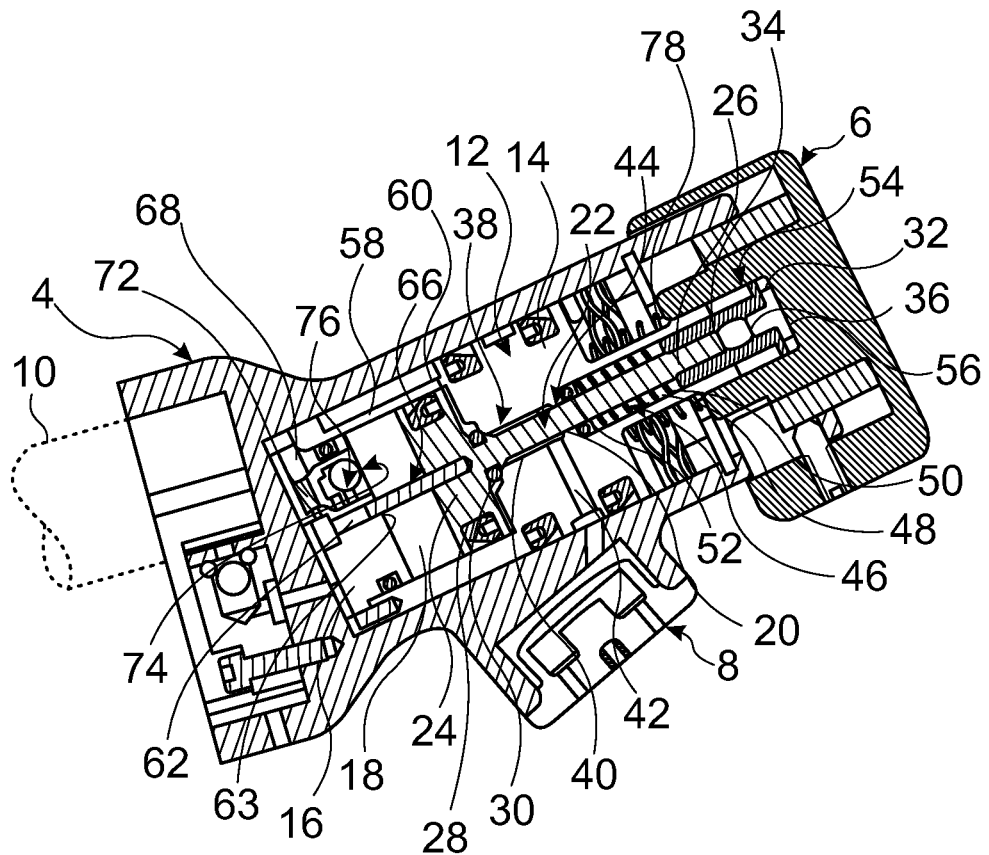
FIG. 2 shows a schematic cross section of a known self closing tap.
Figure 3:
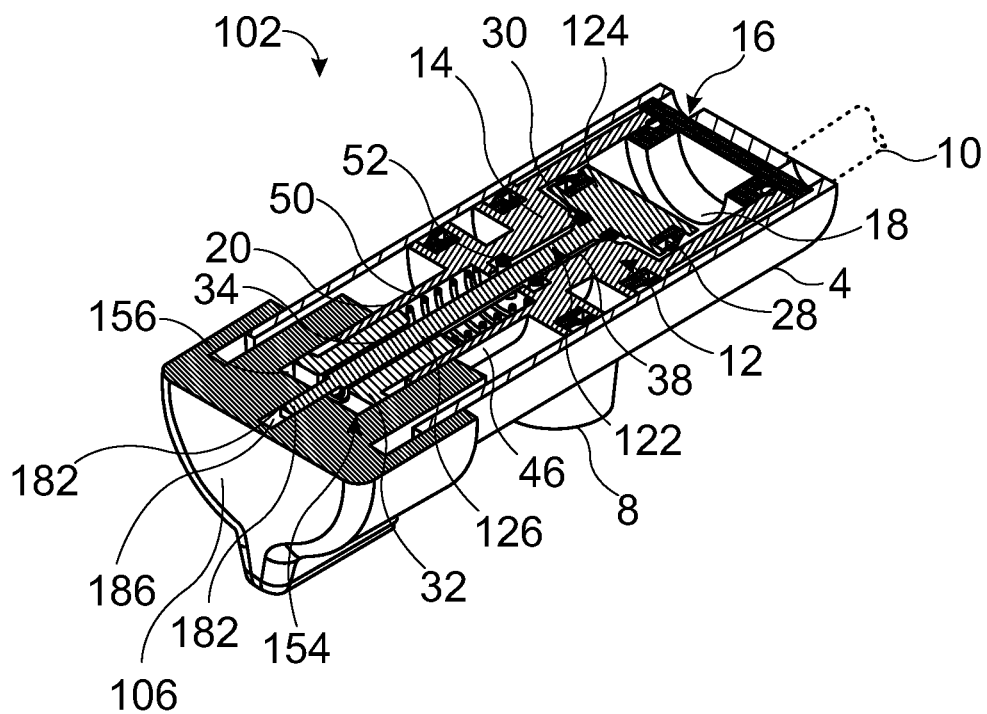
FIG. 3 shows a schematic perspective cross section along the line X-X' of an example of a self closing tap according to the present disclosure.
Figure 4:
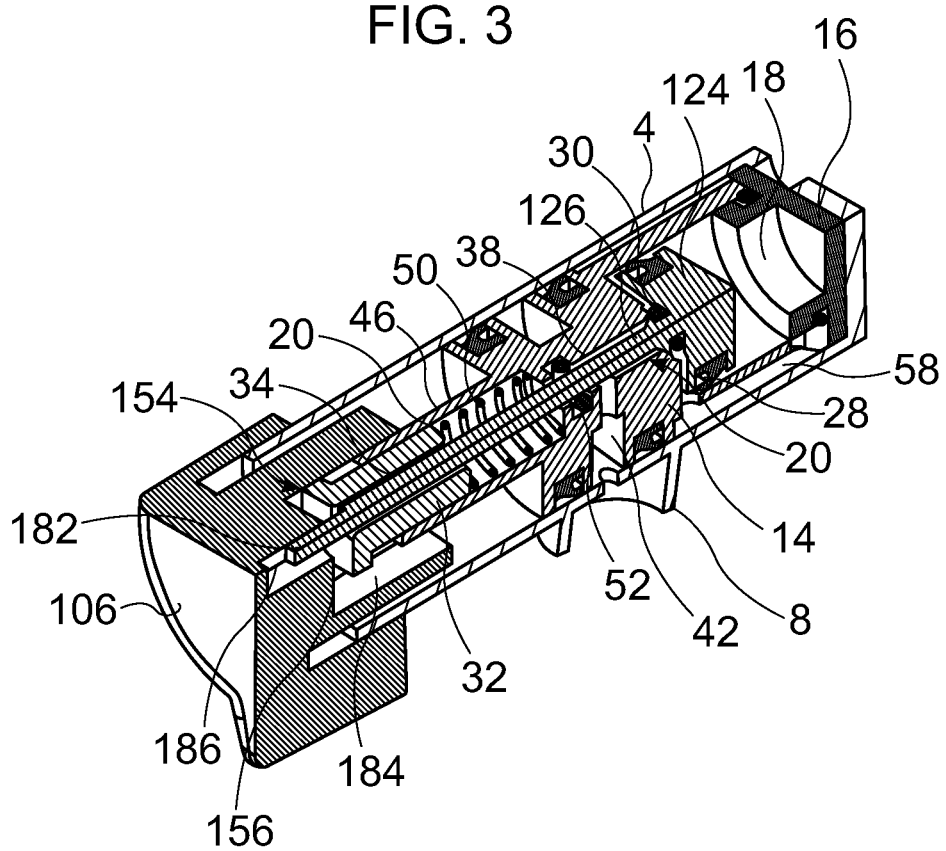
FIG. 4 shows a schematic perspective quartered section along the line X-X' and Y-Y' of the tap of FIG. 3.
Figure 5:
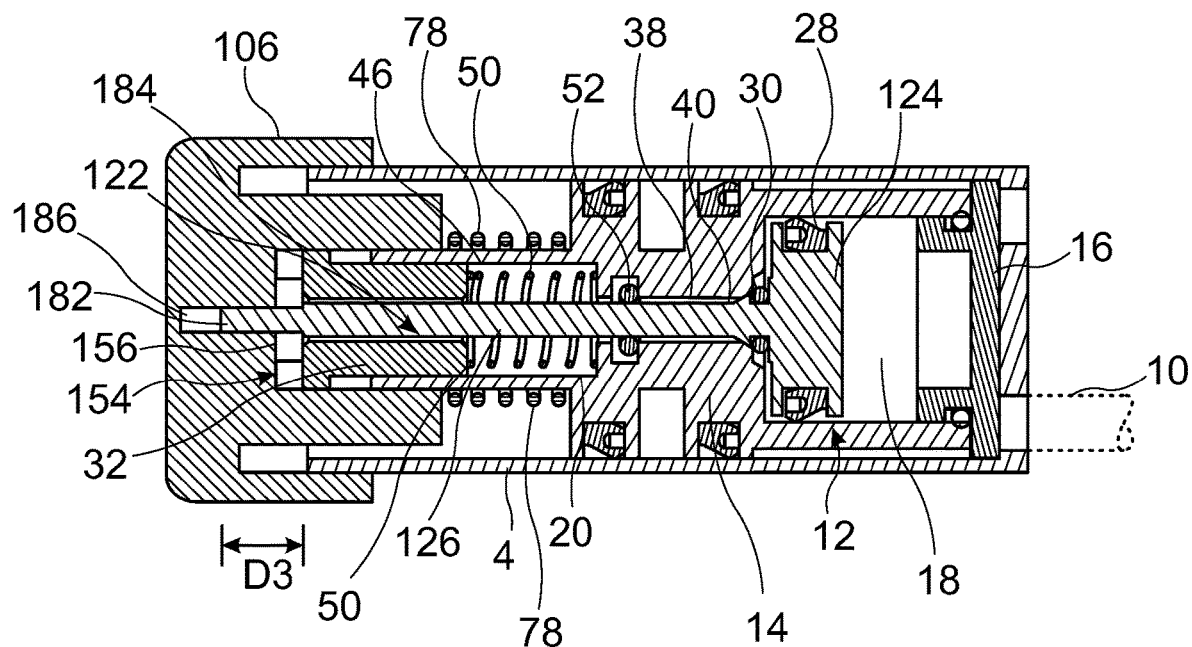
FIG. 5 shows a schematic cross section along the line X-X' of the tap of FIG. 3.
Figure 6:
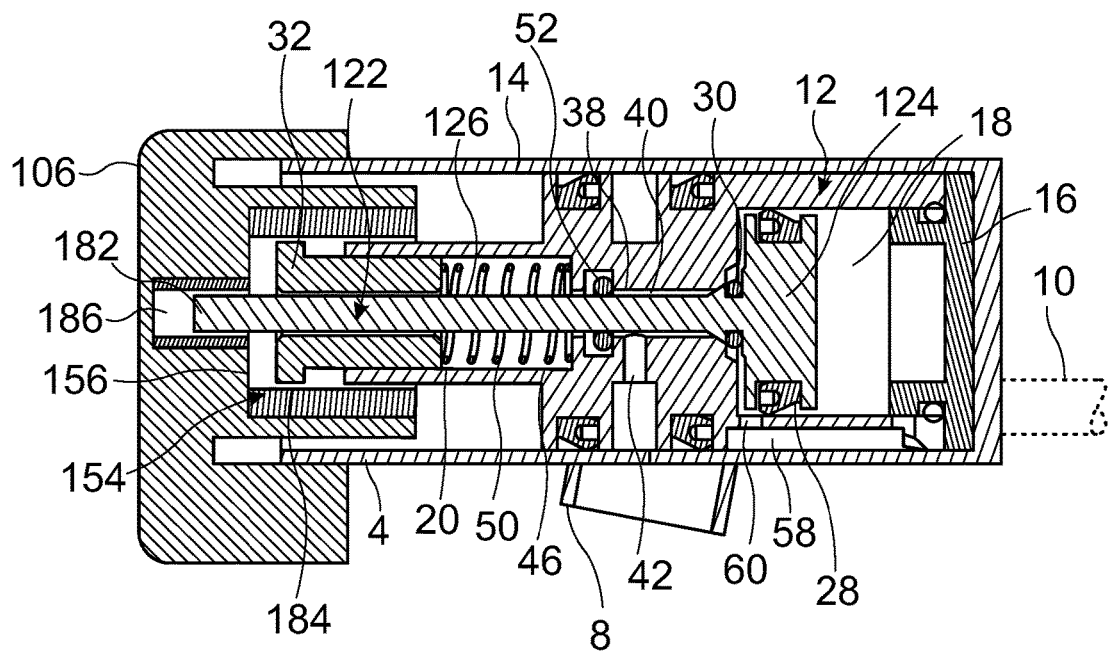
FIG. 6 shows a schematic cross section along the line Y-Y' of the tap of FIG. 3.

With reference to FIG. 2, an example of a known self closing tap is shown. In FIG. 2 the self closing tap is closed with the individual elements of the tap that are capable of movement in their closed position. No water is flowing through the tap as illustrated in FIG. 2. The tap body 4 defines a void in which a cartridge 12 is fitted. The cartridge 12 is formed from a cartridge body 14. The cartridge body 14 and an end plug 16 define a chamber 18, and the cartridge body 14 defines a chamber passage 20.

The chamber 18 is defined by the end plug 16 forming a first end wall, a second end wall which is the wall of the chamber most remote from the end plug 16 and which is a face of the cartridge body 14, and a side wall extending between the first and second end walls. In the tap of FIG. 2, the side wall is substantially cylindrical and a face of the cartridge body 14.

Located within the chamber 18 and cartridge passage 20 is a piston 22. Piston 22 is comprised of a piston head 24 and a piston shaft 26. The piston shaft has a longitudinal axis A (see FIG. 1). The piston head 24 is fixed to a first end of the piston shaft 26 and located in the chamber 18. The piston shaft 26 extends from the piston head 24 and along the chamber passage 20 to a shaft end which is positioned approximately at the end of the chamber passage 20 remote from the chamber 18. The piston head 24 and piston shaft 26 are both substantially cylindrical and have a common longitudinal axis A. The diameter of the cylinder that is the piston head 24 is larger than the diameter of the piston shaft 26.

The piston head 24 and side wall of the chamber 18 are dimensioned so that the piston head 24 is a sliding fit with the side wall of the chamber 18. The piston head 24 includes a first piston seal 28. The piston seal 28 forms a watertight seal between a portion of the axially extending face of the piston head 24 and the portion of the side face of the chamber 18 with which the first piston seal 28 is in contact. The first piston seal is adapted to maintain a watertight seal as it slides along the side face of the chamber 18. References to axially extending and like terminology in this description are, unless otherwise stated, references to the axis A of the piston shaft 26.

The second piston seal 30 is located around or close to the junction of the piston head 24 and piston shaft 26. When the piston 22 in the position shown in FIG. 2 the second piston seal forms a watertight seal between the end of the chamber passage 20 closest to the piston head 24 and the piston shaft 26. In other arrangements, the second piston seal forms a watertight seal between the second face of the chamber 18 and the piston head 24 and or piston shaft 26 dependent upon the configuration of the second seal 30.

Both of the first and second piston seals form a watertight seal at water pressures expected to be applied by the water supply 10 to which the tap 2 is connected. For example, the first and second seals 28, 30 may be constructed to maintain a watertight seal in connection with pressures in the range 0 kPa to at least 700 kPa, and resultant pressure differentials of up to at least 700 kPa across the seal.

Attached to the piston shaft 26 at a position remote from the piston head 24 and close to the shaft end of the piston shaft 26 is a plunger 32. The plunger 32 is connected to the piston shaft 26 via a helical thread 34. Rotation of the plunger 32 around the axis A of the piston shaft 26 causes the plunger to move along the piston shaft 26. A set screw 36 is screwed into the shaft end (also termed second end) of the piston shaft 26 to lock the plunger 32 in position. Frequently a drop of adhesive (not shown) is used to fix the set screw 36 to the piston shaft 26 and prevent rotation of the set screw 36.

The chamber passage 20 is substantially circular in cross section and, longitudinally, defines three differently diametered cylinders placed end to end. Each of the cylinders is substantially co-axial with the piston shaft 26. Extending from the end of the chamber passage 20 closest to the piston head 24 is a first cylinder 38 of a diameter that is larger than the diameter of the piston shaft 26. An annulus 40 is formed between the face of the cartridge body 14 defining cylinder 38 and the piston shaft 26. The annulus 40 is so dimensioned that water can flow longitudinally along the annulus at a predetermined desired flow rate.

A first end of a spout passage 42 opens into the first cylinder 38 at a location separated from the end of the chamber passage 20 closest to the piston head. The other end of the spout passage opens into the spout 8.

The end of first cylinder 38 of the chamber passage 20 remote from the piston head 24 is partially common with a second cylinder 44. The second cylinder 44 is of smaller diameter than the first cylinder 38, and preferably of such a diameter that the longitudinal face of cylinder 44 is in sliding fit with the face of the piston shaft 26 where it passes along the cylinder 44.

The end of second cylinder 44 of the chamber passage 20 remote from the piston head 24 is common with part of a first end face of a third cylinder 46. The third cylinder 46 is of larger diameter than the second cylinder 44. An annulus 48 is formed between the face of the cartridge body 14 defining cylinder 46 and the piston shaft 26.

Adjacent the interface between the second and third cylinders 44, 46 there is a third piston seal 52 forming a watertight seal between the piston shaft 26 and the cylindrical face of the third cylinder 46. The third piston seal forms the watertight seal at water pressures expected to be experienced from the water supply 10 to which the tap 2 is connected. For example, the third piston seal 52 may be constructed to maintain a watertight seal in connection with water pressures in the range 0 kPa to at least 700 kPa, and resultant pressure differentials of up to at least 700 kPa across the seal. The third piston seal 52 is adapted to maintain a watertight seal when the piston shaft 26 moves in a longitudinal direction through the seal 52.

The annulus 48 is so dimensioned that a helical spring 50 sitting around the piston shaft 26 loosely sits in the annulus 48. The annulus 48 is also so dimensional that a portion of the plunger 32 can move longitudinally along the annulus 48. The helical spring 50 has a first end abutting the third piston seal 52 or a washer (not labelled) overlying the portion of the seal 52 facing the helical spring 50. The second end of the helical spring 50 abuts the end of the plunger 32 facing the helical spring 50, or a washer (not labelled) overlying the face of the plunger 32 facing the helical spring 50.

The knob 6 defines a recess 54 with an end face 56. The recess 54 is so dimensioned that the plunger 32 is close to or abuts the end face 56 when the tap is closed. The knob 6 abuts a washer 80 which is directly or indirectly in contact with a first end of a wave spring 78. The second end of the wave spring 78 bears upon a portion of the outer face of the cartridge body 14. When the tap is in the closed position as shown in FIG. 2, the wave spring 78 is uncompressed or lightly compressed.

The cartridge body 14 and end plug 16 which define the chamber 18 also define a number of passages that open into the chamber 18. A supply passage 58 mouths into the chamber 18 through a mouth 60. The mouth 60 is in fluid communication with the water supply 10 via the supply passage 58. The mouth 60 is so located that when the piston 22 is in the closed position as shown in FIG. 2 the mouth 60 is partially or wholly closed by the first piston seal 28 or, as shown, between the first piston seal 28 and the second piston seal 30.

The end plug 16 defines a pin passage 62 which mouths into the chamber 18 through a mouth 64 in the end plug 16. The pin passage 62 is substantially circular in cross section with a diameter D1. The mouth 64 is in fluid communication with the water supply 10 via a supply passage 68 and the pin passage 62. The supply passage 68 includes a first check valve 70 (also known as a non-return valve) which permits the flow of water from the water supply 10 to the pin passage mouth 64 but prevents the flow of water in the opposite direction.

Extending from a blind bore 64 that extends into the piston head 24 in a location and direction co-axial with the piston shaft 26 is a pin 66. The pin 66 is substantially circular in cross section and has a diameter D2. Diameter D2 is less than diameter D1 of the pin passage 62, and the difference between D1 and D2 is calculated so as to create an annulus (not labelled) between the pin passage 62 and the pin 66 which allows water to flow along the annulus at a predetermined rate.

The end plug 16 also defines a purge passage 72 which opens into the chamber 18 via a mouth 74. The purge passage 72 extends between the mouth 74 and the water supply 10. The purge passage 72 includes a second check valve 76 which permits the flow of water from the chamber 18 to the water supply 10 but not in the opposite direction.

To use the tap 2, a user will push the knob 6. The knob 6 will travel toward the end plug 16 until the structure of the knob 6 interferes with a stop or the wave spring 78 is fully compressed. The movement of the knob 6 causes the end face 56 of the recess 54 to bear upon the plunger 32 and to push the piston 22 towards the end plug 16.

Movement of the piston 22 towards the end plug 16 causes the following effects substantially simultaneously:
- The piston head 24 pushes water out of the portion of the chamber 18 between the end plug 16 and the piston head 24 via the purge passage 72;
- The pin 66 is pushed further into the pin passage 62 by the piston head 24;
- The first piston seal 28 ceases to overlie the mouth 60 of the supply passage 58 if the mouth 60 was being overlaid by the first piston seal 28;
- The watertight seal between the piston 22 and the cartridge body 14 formed by the second piston seal 30 is broken;
- Water will start to flow from the mouth 60 of the supply passage 58 along the annulus 40 and to the spout 8 via the spout passage 42; and
- the helical spring 50 is compressed.

Once the user stops pushing the knob 6 the following effects start substantively simultaneously:
- The wave spring 78 decompresses and impels the knob 6 back to its original position;
- Movement of the knob 6 back to its original position causes the end face 56 of recess 54 to move away from the plunger 32 and to stop pushing the piston 22 towards the end plug 16;
- The helical spring 50 starts to impel the piston 22 back towards its closed position;
- The movement of the piston 22 back towards its original position causes the pressure in the portion of the chamber 18 between the piston head 24 and plug end 16 to decrease to below the pressure of the water between the piston head 24 and the second end wall of the chamber 18. The movement of the piston head 24 and consequent pressure drop will continue until the difference in pressure on each side of the piston head 24 balances the force exerted by the helical spring 50; and
- Water starts to flow along the annulus between the pin 66 and the pin passage 62 (the pin annulus).

The flow of the water into the portion of the chamber 18 between the end plug 16 and the piston head 24 through the pin annulus raises the pressure in the portion of the chamber 18 between the piston head 24 and plug end 16 which, in turn, allow the helical spring to impel the piston 22 back towards its original position until the pressure in that portion of chamber 18 reduce so as to, again, balance the force exerted by the spring 50. The flow of water along the pin annulus continues until the piston is back in its original closed position, the second piston seal remakes a watertight seal between the piston 22 and the cartridge body 14, and the pressure either side of the piston head 24 is substantially equal.

The time that the piston 22 takes to return to its original closed position is dependent on how much of the portion of the chamber 18 between the end plug 16 and the piston head 24 is purged of water when the knob 6 is depressed. This in turn is dependent on the longitudinal position of the plunger 32 on the piston shaft 26. This longitudinal position may be adjusted by removing the knob 6 from the tap body 4, loosening set screw 36, and then rotating the plunger 32 around the axis of the piston shaft 26 so that the helical thread 34 causes the plunger to move along the piston shaft 26. Once the plunger is in the desired position, that is the tap will run for the desired length of time before it turns off, the set screw is then tightened and a drop of adhesive applied to the set screw to keep the plunger 32 in the desired position.

In this description the same reference numerals are used in connection with the elements of the example of the tap of the present disclosure which is illustrated in FIGS. 3 to 6 as are used in FIG. 2 when the elements of the tap of the present disclosure and the tap illustrated in FIG. 2 are the same as or equivalent to each other.

With reference to FIGS. 3 to 6, a self closing tap 102 has a structure and function similar to that of the tap 2 of FIGS. 1 and 2 with the important differences set out below. In FIGS. 3 to 6 the self closing tap of the present disclosure is closed with the individual elements of the tap that are capable of movement in their closed position. No water is flowing through the tap as illustrated in FIGS. 3 to 6.

The tap body 4 defines a void in which a cartridge 12 is fitted. The cartridge 12 is formed from a cartridge body 14. The cartridge body 14 and an end plug 16 define a chamber 18, and the cartridge body defines a chamber passage 20.

The chamber 18 is defined by the end plug 16 forming a first end wall, a second end wall which is the wall of the chamber most remote from the end plug 16 and which is defined by a face of the cartridge body 14, and a side wall extending between the first and second end walls which is defined by the cartridge body 14. In the tap of FIGS. 3 to 6, the side wall is substantially cylindrical.

Located within the chamber 18 and cartridge passage 20 is a piston 122. Piston 122 comprises a piston head 124, a piston shaft 126, and an engagement end 182. The piston head is fixed to first end of the piston shaft 126 and the engagement end 182 is the other end of the piston shaft 126. The piston head 124 is located in the chamber 18, and the piston shaft extends through the chamber passage 20 with the engagement end 182 extending out of the end of the chamber passage 20 remote from the chamber 18. The piston head 124 and piston shaft 126 are both substantially cylindrical and both have the same longitudinal axis A. The diameter of the cylinder that is the piston head 124 is larger than the diameter of the piston shaft 126. The engagement end 182 extends for a distance D3 from the end of the piston shaft 126 remote from the piston head 124.

The piston head 124 is dimensioned so that the axially extending faces of the piston head 124 are a sliding fit with the side wall of the chamber 18. The piston head 124 includes a first piston seal 28. The piston seal 28 forms a watertight seal between a portion of the axially extending face of the piston head 124 and the portion of the side face of the chamber 18 with which the first piston seal 28 is in contact. The first piston seal is adapted to maintain a watertight seal as it slides along the side face of the chamber 18.

The engagement end 182 of the piston shaft 182 has a rectangular cross section in a plane perpendicular to the axis A along its whole length. The engagement end 182 can have other, non-circular, cross sectional shapes in other examples of the present disclosure.

The second piston seal 30 is located around or close to the junction of the piston head 124 and piston shaft 126 and is between the piston 122 and the cartridge body 14. When the piston 122 is in the position shown in FIGS. 3 to 6 the second piston seal 30 forms a watertight seal between the end of the chamber passage 20 closest to the piston head 124 and the piston shaft 126. In other arrangements, the second piston seal forms a watertight seal between the second face of the chamber 18 and the piston head 124 and or piston shaft 126 dependent upon the configuration of the second seal 30. Both of the first and second piston seals form the watertight seal at water pressures in the range 0 kPa to at least 700 kPa, and resultant pressure differentials of up to at least 700 kPa across the seal.

Attached to and surrounding a portion of the piston shaft 126 adjacent or nearly adjacent to the engagement end 182 is a plunger 32. Plunger 32 is attached to the piston shaft 126 via a helical thread 34. Rotation of the plunger 32 around the longitudinal axis A of the piston shaft 126 causes the plunger to move longitudinally along the piston shaft 126.

The chamber passage 20 is substantially circular in cross section and, longitudinally, defines two differently diametered cylinders placed end to end. Each of the cylinders is substantially co-axial with the piston shaft 126.

Extending from the end of the chamber passage 20 closest to the piston head 124 is a first cylinder 38 of a diameter that is larger than the diameter of the piston shaft 126. The first end of the cylinder 38 is closer to the piston head 124 than the second end of the cylinder 38. An annulus 40 is formed between the face of the cartridge body 14 defining cylinder 38 and the piston shaft 126. The annulus 40 is so dimensioned that water can flow longitudinally along the annulus 40 at a predetermined desired flow rate.

A first end of a spout passage 42 opens into the first cylinder 38 at a position spaced from the first end of the cylinder 38. The other end of the spout passage 42 opens into the spout 8.

Adjacent the second end of the first cylinder 38 there is provided a third piston seal 52 adapted to form a watertight seal between the piston shaft 126 and the cartridge body 14 that defines the cylindrical face of the first cylinder 38. Seal 52 prevents water flowing further along the chamber passage 20 than the seal 52. The third piston seal 52 is anchored to the cartridge body 14, for example by being recessed in an annular groove, and so constructed that the piston shaft 126 may slide through the seal 52 without breaking the watertight seal. The third piston seal 52 forms a watertight seal at water pressures expected to be experienced from the water supply to which the tap 2 is connected. For example, the third piston seal 52 may be constructed to maintain a watertight seal in connection with water pressures in the range 0 kPa to at least 700 kPa, and resultant pressure differentials of up to at least 700 kPa across the seal.

The second end of the first cylinder 38 of the chamber passage 20 is partially common with a second cylinder 46. The second cylinder 46 is of a larger diameter than the first cylinder 38. An annulus 48 is formed between the face of the cartridge body 14 defining cylinder 46 and the piston shaft 126.

The annulus 48 is so dimensioned that a helical spring 50 sitting around the piston shaft 126 loosely sits in the annulus 48. The annulus 48 is also so dimensioned that a portion of the plunger 32 can move longitudinally along the annulus 48. The helical spring 50 has a first end abutting the portion of the end of the second cylinder 46 radially outward from the portion of that end common with the first cylinder 38. The second end of the helical spring 50 abuts the end of the plunger 32 facing the helical spring 50, or a washer (not shown) overlying the face of the plunger 32 facing the helical spring 50.

The tap handle shown in FIGS. 3 to 6 is a knob 106 with the tap handle interface integral with the knob 106. In other unillustrated examples of the tap of the present disclosure the tap handle interface defines the recesses as described hereafter and has a configuration that is adapted to engage with a suitable mounting means on a tap handle.

The knob 106 defines a second recess 154 with an end face 156 and side walls 184. The second recess 154 is so dimensioned that the second end of the plunger 32 is close to or abuts the end face 156 when the tap 102 is in its closed position. The knob 106 abuts a first end of a wave spring 78 (shown in FIG. 5 only). The second end of the wave spring 78 bears upon a portion of the outer face of the cartridge body 14. When the tap 102 is in the closed position as shown in FIGS. 3 to 6, the wave spring 78 is uncompressed or lightly compressed.

The plunger 32 and the side walls 184 of the second recess 154 are also so dimensioned and configured that when the second end of the plunger 32 is within the second recess 154 the side walls 184 will interfere with the second end of the plunger 32, if the plunger 32 tries to rotate about the axis A of the piston shaft 126. The knob 106 further defines a first recess 186 in the end face 156 of the first recess 154. The first and second recess 186, 154 are located in a position that allows the engagement end 182 of the piston shaft 126 to extend into the first recess 186 and are coaxial.

The shape of the first recess 186 in a plane perpendicular to axis A is rectangular and the first recess is dimensioned so that the engagement end 182 cannot rotate around axis A whilst within the first recess. The first recess can have other cross sections as long as they prevent rotation of the engagement end 182 about axis A whilst it is in the first recess. This arrangement of a first and second recess 186, 154 respectively preventing rotation of the piston shaft 126 and plunger 32 around axis A is particularly beneficial because it has the effect that whilst the knob 106 is fixed to the tap body 4 the longitudinal position of the plunger 32 along the piston shaft 126 cannot change or be changed. When the knob 106 is fixed to the tap body 4 using tamper proof fixing means, unauthorised adjustment of the tap 102 can be minimised.

In unillustrated embodiments where the tap handle and the tap handle interface are separate, the same benefit occurs as that discussed above because when the engagement end and the plunger are engaged with their respect recesses the tap handle interface will either prevent any rotation of the engagement end and the plunger, or will ensure that both of the engagement end and the plunger will rotate about axis A at the same time and there will thus be no relative rotation between the engagement end and the plunger. As such the plunger will not move along the piston shaft.

The cartridge body 14 and end plug 16 which define the chamber 18 also define a number of passages the open into the chamber 18. A supply passage 58 mouths into the chamber 18 through a mouth 60. The mouth 60 is in fluid communication with the water supply 10 via the supply passage 58. The mouth 60 is so located that when the piston 122 is in the closed position as shown in FIGS. 3 to 6 the mouth 60 is partially or wholly closed by the first piston seal 28 or between the first piston seal 28 and the second piston seal 30.

In a similar fashion to the tap 2 of FIG. 2, the end plug 16 of tap 102 defines a pin passage (not shown) which mouths into the chamber 18 through a mouth (not shown) in the end plug 16. The pin passage is substantially circular in cross section with a diameter D1. The mouth of the pin passage is in fluid communication with the water supply 10 via a supply passage (not shown) and the pin passage. The supply passage includes a first check valve (not shown) (also known as a non-return valve) which permits the flow of water from the water supply 10 to the mouth of the pin passage but prevents the flow of water in the opposite direction.

Extending from a blind bore (not shown) that extends into the piston head 124 in direction co-axial with the piston shaft 126 is a pin (not shown). The pin is substantially circular in cross section and has a diameter D2. Diameter D2 is less than the diameter D1 of the pin passage, and the difference between D1 and D2 is calculated so as to create an annulus (not shown) between the pin passage and the pin which allows water to flow along the annulus at a predetermined rate.

The end plug 16 also defines a purge passage (not shown) which opens into the chamber 18 via a mouth (not shown). The purge passage extends between the mouth and the water supply 10. The purge passage includes a second check valve (not shown) which permits the flow of water from the chamber 18 to the water supply 10 but not in the opposite direction.

To use the tap 102, a user will push the knob 106. The knob 106 will travel toward the end plug 16 until the structure of the knob 6 interferes with a stop or the wave spring 78 is fully compressed. The movement of the knob 106 causes the end face 156 of the second recess 154 in knob 106 to bear upon the plunger 32 and to push the piston 122 towards the end plug 16.

Movement of the piston 122 towards the end plug 16 causes the following effects substantially simultaneously:
  The piston head 124 pushes water out of the portion of the chamber 18 between the end plug 16 and the piston head 124 via the purge passage (not shown);
  The pin (not shown) is pushed further into the pin passage (not shown) by the piston head 124;
  The first piston seal 28 ceases to overlie the mouth 60 of the supply passage 58 if the mouth 60 was being overlaid by the first piston seal 28;
  The watertight seal between the piston 22 and the cartridge body 14 formed by the second piston seal 30 is broken;
  Water will start to flow from the mouth 60 of the supply passage 58 along the annulus 40 and to the spout 8 via the spout passage 42; and
  the helical spring 50 is compressed.

Once the user stops pushing the knob 106 the following effects start substantively simultaneously:
  The wave spring 78 decompresses and impels the knob 106 back to its original position;
  Movement of the knob 106 back to its original position causes the end face 156 to move away from the plunger 32 and to stop pushing the piston 122 towards the end plug 16;
  The helical spring 50 starts to impel the piston 122 back towards its closed position;
  The movement of the piston 122 back towards its original position causes the pressure in the portion of the chamber 18 between the piston head 24 and plug end 16 to decrease to below the pressure of the water between the piston head 24 and the second end wall of the chamber 18. The movement of the piston head 24 and consequent pressure drop will continue until the difference in pressure on each side of the piston head 24 balances the force exerted by the helical spring 50; and;

Water starts to flow along the annulus between the pin (not shown) and the pin passage (not shown) (the pin annulus).

The flow of the water into the portion of the chamber 18 between the end plug 16 and the piston head 124 through the pin annulus raises the pressure in the portion of the chamber 18 between the piston head 124 and plug end 16 which, in turn, allow the helical spring to impel the piston 122 back towards its original position until the pressure in that portion of chamber 18 reduce so as to, again, balance the force exerted by the spring 50. The flow of water along the pin annulus continues until the piston is back in its original closed position, the second piston seal remakes a watertight seal between the piston 122 and the cartridge body 14, and the pressure either side of the piston head 124 is substantially equal.

The time that the piston 122 takes to return to its original closed position is dependent on how much of the portion of the chamber 18 between the end plug 16 and the piston head 124 is purged of water when the knob 106 is depressed. This in turn is dependent on the longitudinal position of the plunger 32 on the piston shaft 126. This longitudinal position may be adjusted by removing the knob 106 from the tap body 4 and then rotating the plunger 32 around the axis A of the piston shaft 126 so that the helical thread 34 causes the plunger to move along the piston shaft 126. Once the plunger is in the desired position, that is the tap will run for the desired length of time before it turns off, the knob 106 is re attached to the tap body 4.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the cartridges for self closing taps and self closing taps disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A self closing tap comprising a cartridge and a tap handle interface, in which the cartridge comprises a piston, and a plunger in which
   the piston is comprised of a piston head, and a piston shaft,
   the piston shaft has a longitudinal axis and is fixed to the piston head at a first end, and the second end of the piston shaft is an engagement end,
   the plunger is movably fixed to a first portion of the piston shaft and adapted to move such that the plunger moves longitudinally along the first portion of the piston shaft,
   the plunger has a first and second end with the second end of the plunger being closer to the engagement end of the piston shaft than the first end,
   the tap handle interface comprises a first and second recess,
   the first recess is adapted such that the first recess receives the engagement end of the piston shaft and prevents rotation of the piston shaft around its longitudinal axis, and the second recess is adapted such that the second recess receives at least the second end of the plunger and prevents rotation of the plunger around the piston shaft.

2. A self closing tap according to claim 1 in which the plunger comprises a bore which extends through the plunger from the first end to the second end, the bore is threaded with a helical thread, the first portion of the piston shaft has a helical thread on the outside face of the piston shaft, the fixing of the plunger to the piston shaft is via the engagement of the helical threads of the bore and the first portion of the piston shaft, and rotation of the plunger around the piston shaft causes movement of the plunger along the piston shaft.

3. A self closing tap according to claim 1 in which the engagement end has a cross section substantially the shape of a polygon in a plane substantially perpendicular to the longitudinal axis of the piston shaft.

4. A self closing tap according to claim 1 in which the first recess has a cross section substantially the shape of a polygon in a plane substantially perpendicular to the longitudinal axis of the piston shaft.

5. A self closing tap according to claim 1 in which the cross section of the first recess is substantially the same shape as the cross section of the engagement end.

6. A self closing tap according to claim 1 in which the engagement end comprises one or more ribs or grooves, the first recess comprises one or more of the other of ribs or grooves, and the ribs of the engagement end or first recess are configured such that the ribs or first recess engages with the grooves of the first recess or engagement end when the engagement end is introduced into the first recess.

7. A self closing tap according to claim 1 in which the second end of the plunger has a cross section substantially the shape of a polygon in a plane substantially perpendicular to the longitudinal axis of the piston shaft.

8. A self closing tap according to claim 1 in which the second recess has a cross section substantially the shape of a polygon in a plane substantially perpendicular to the longitudinal axis of the piston shaft.

9. A self closing tap according to claim 1 in which the cross section of the second recess is substantially the same shape as the cross section of the second end of the plunger.

10. A self closing tap according to claim 1 in which the second end of the plunger comprises one or more ribs or grooves, the second recess comprises one or more of the other of ribs or grooves, and the ribs of the second end or second recess are configured such that the ribs or second recess engages with the grooves of the second recess or second end when the second end is introduced into the second recess.

11. A self closing tap according to claim 1 further comprising a tap handle in which the tap handle is a knob or a lever is adapted such that the knob or lever is pushed causing the tap to open, and the tap handle interface is integral with the tap handle, or the tap handle interface and tap handle are configured such that the tap handle interface and the tap handle are attached to each other.

12. A self closing tap according to claim 1 in which the tap further comprises a tap body, the tap handle is fixed to the tap body using a tamper proof fixing means.

13. A kit of parts for repairing or updating a tap comprising at least one self closing tap according to claim 1.

14. A water supply system comprising at least one self closing tap according to claim 1, a water source, and one or more conduits fluidly connecting the or each tap with the water source.

15. A system comprising: an aircraft including a water supply system according to claim 14 installed in the aircraft.

* * * * *